No. 795,509. PATENTED JULY 25, 1905.
R. T. HAZELTON.
VARIABLE SPEED MECHANISM.
APPLICATION FILED MAY 3, 1905.
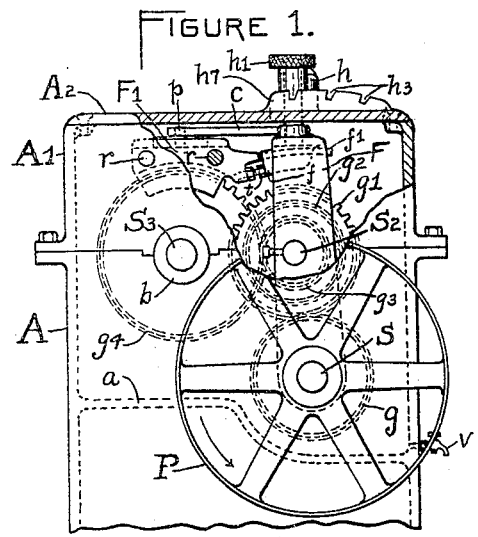
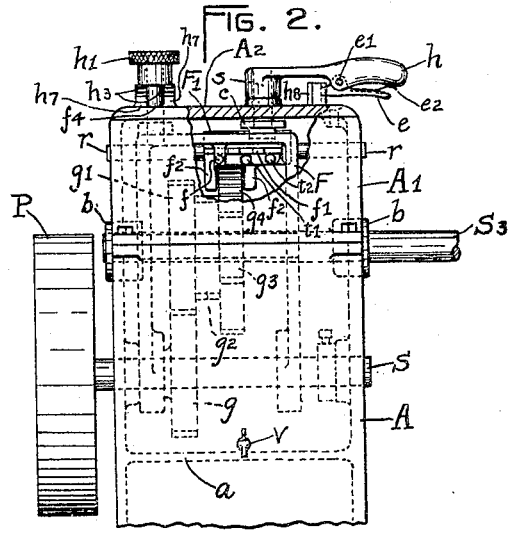
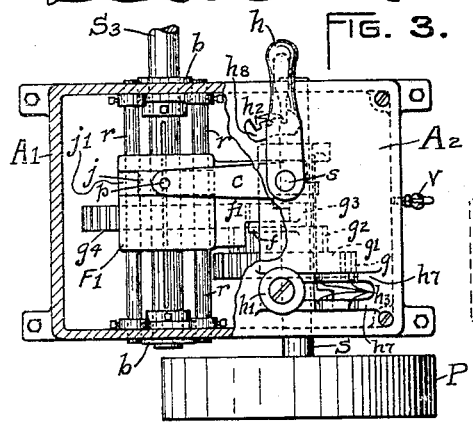
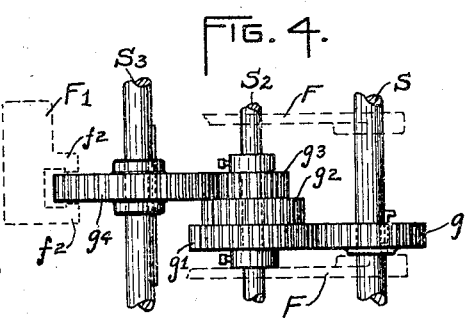
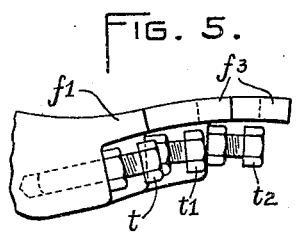
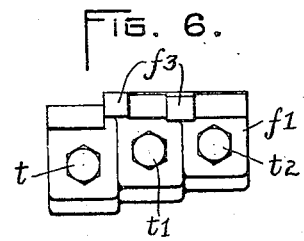
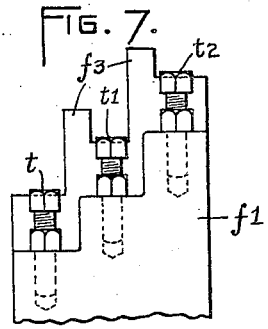
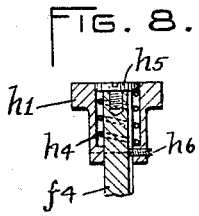
WITNESSES:
Albert C. Bell.
Clara M. Simer.
INVENTOR:
Robert T. Hazelton
BY Wm. H. Cooley
ATTY.

UNITED STATES PATENT OFFICE.

ROBERT T. HAZELTON, OF ROCHESTER, NEW YORK.

VARIABLE-SPEED MECHANISM.

No. 795,509.  Specification of Letters Patent.  Patented July 25, 1905.

Application filed May 3, 1905. Serial No. 258,646.

*To all whom it may concern:*

Be it known that I, ROBERT T. HAZELTON, a citizen of the United States, residing at Rochester, in the county of Monroe and State of New York, have invented a new and Improved Variable-Speed Mechanism, of which the following is a specification.

The object of my invention is to provide a means for varying the ratio between the speeds of a driving and a driven shaft by means of suitable gearing and to reduce the number of moving parts to a minimum.

Another object of my invention is to provide interlocking mechanism for preventing improper adjustment of the gears, the elements of which are carried directly by the parts used in securing the variation in speed ratio.

Heretofore it has been usual in mechanisms of this class to use a cone-gear on a first shaft and on a second shaft to spline a gear meshing with a second gear, such second gear revolubly supported in a frame both angularly and longitudinally adjustable on such second shaft, so that such second gear may be brought into mesh with any desired one of the gears forming the cone. In some constructions, however, instead of having a gear splined on the second shaft such gear is rigidly keyed to the shaft and made of such a length that the intermediate and adjustable gear may be moved longitudinally on such first gear to mesh with any desired one of the gears forming the cone. In mechanisms of this class it has been customary to form the safety devices for preventing improper engagement or adjustment of the gears when used at all on or in the frame of the machine. Such devices are difficult to construct on account of the accuracy required in tooling and the size and weight of the parts that must be handled.

In my invention I overcome the defects inherent in the above constructions by mounting the cone-gear in a swinging frame, which is capable of angular adjustment only, on a a shaft to which there is rigidly keyed a gear meshing permanently with one of the gears of the cone. On a second shaft instead of the usual cone-gear a single gear is splined and adjustable longitudinally on such shaft by means of a sliding yoke supported from the frame of the machine. Such sliding yoke and also the swinging frame carry members coöperating to prevent improper engagement of the gears, and since these parts are comparatively light any special tooling on them that may be required before assembling the machine is readily done. The sliding yoke and swinging frame are also provided with adjustable and coöperating devices by means of which a proper meshing of each of the gears of the cone with the adjustable gear is effected without tooling.

The several drawings illustrating my invention are as follows: Figure 1 is an end view, Fig. 2 is a side view, and Fig. 3 a top view, of that portion only of a gear-driven machine necessary to show my invention as embodied therein, with portions of the end, side, and top, respectively, of the casing broken away in the above-mentioned views to indicate more clearly the arrangement of the parts. Fig. 4 is a stretched-out view of the gears used to secure the speed variation. Figs. 5, 6, and 7 are end, side, and bottom views of one member of the interlocking mechanism. Fig. 8 is a vertical sectional view through the center of the adjusting-handle $h'$.

Similar letters refer to similar parts throughout the several views.

As seen in the several drawings, the machine is arranged to be driven by a pulley P, secured to a shaft S, supported in suitable bearings in the portion A of the frame and case of the machine. This shaft S supports a swinging frame F, so that it is free to turn upon such shaft S, but is prevented from moving longitudinally on such shaft by one of the bearings of such shaft and the gear $g$, which is keyed to the shaft S, as seen in Fig. 4. This frame F carries the cone-gear, preferably supported and arranged as follows, viz: A shaft $S^2$ is rigidly secured in the frame F by suitable set-screws, as indicated, and upon this shaft $S^2$ the cone-gear, composed of the several gears $g'$, $g^2$, and $g^3$, is arranged to revolve. This cone-gear is so supported upon the shaft $S^2$ that the gear $g'$ meshes with the gear $g$ and is prevented from longitudinal motion on such shaft by suitable collars, as shown in Fig. 4.

The driven shaft $S^3$ is so supported in bearings $b$ in the two portions A and A' of the frame of the machine that the gear $g^4$, carried by such shaft $S^3$, may be engaged by one of the gears $g'$, $g^2$, and $g^3$, according to the position of the gear $g^4$ longitudinally on the shaft $S^3$. This gear $g^4$ is splined on the shaft $S^3$ and is arranged to be moved longitudinally on such shaft by means of the yoke F', slidably supported upon the guide-rods $r$, secured in the frame of the machine. These rods $r$, as well as the shaft $S^3$, are prevented from moving longitudinally in the frame of the machine by suitable collars and set-screws, as indicated in Fig. 3. The sliding yoke $F'$ has downwardly-extending arms $f^2$, one on either side of the gear $g^4$, separated from each other a distance slightly in excess of the thickness or face of such gear, permitting such gear to revolve freely between such arms and causing it to be moved longitudinally on the shaft $S^3$ by the sliding of the yoke $F'$ longitudinally of the machine and on the rods $r$.

In the top of the sliding yoke $F'$ a slot $j'$ is formed, in which a sliding block $j$ is arranged to travel. This block $j$ carries a pin $p$, projecting upwardly therefrom, and this pin $p$ is engaged by the outer end of a crank $c$, carried by a short vertical shaft $s$, having its bearing in the top piece $A^2$, suitably secured by screws, as indicated, to the upper portion $A'$ of the frame of the machine. A handle $h$ is secured to the upper end of this shaft $s$ for the purpose of moving it angularly, and thereby adjusting the sliding yoke $F'$ on the rods $r$. This handle $h$ is provided with a latch $e$, pivoted at $e'$ and caused to normally engage suitable notches $h^2$, formed in a projecting lug $h^8$ on the top $A^2$ of the frame of the machine, by means of a spring $e^2$, carried by such latch $e$. This lug $h^8$ is so conformed, as indicated in Fig. 3, as to prevent the handle $h$ from being moved so far in either direction as to cause the gear $g^4$ to be moved beyond and out of mesh with the gear $g^3$ or $g'$, as the case may be.

In order that the gear $g^4$ may mesh properly with the desired one of the gears $g'$, $g^2$, and $g^3$, the swinging frame F is provided with an operating-handle $h'$, by means of which this frame may be adjusted angularly on the shaft S. This handle $h'$ has projections formed on its lower end for engaging the slots $h^3$, formed therefor in sectors $h^7$ on the top $A^2$ of the frame of the machine, and this handle $h'$ is arranged to be forced into engagement with these slots by means of the spring $h^4$, arranged, as seen in Fig. 8, in a recess therefor in such handle and held in place by a screw $h^5$ in the upper end of the rod $f^4$, which rod in turn is rigidly secured in the upper portion of the frame F. A screw $h^6$ is provided in the handle $h'$ to engage a keyway in the rod $f^4$ to prevent such handle from turning on such rod.

In order to necessitate the right sequence in the movement of the handles $h$ and $h'$ in the adjustment of the sliding yoke $F'$ and the swinging frame F in the operation of my mechanism, a projection $f''$, formed on the sliding yoke $F'$ and arranged to pass under the upper member of the swinging frame F, has suitable extensions $f^3$ formed thereon arranged to coöperate with a lug $f$, projecting from the under surface of the upper member of the swinging frame F. The arrangement is such that when it is desired to have the gear $g^4$ mesh with the gear $g^3$ the lug $f$ will be to the left, as seen in Fig. 7, of the extensions $f^3$. When it is desired to have the gear $g^4$ mesh with the gear $g^2$ the lug $f$ will lie between the extensions $f^3$, and when it is desired to have the gear $g^4$ mesh with the gear $g'$ the lug $f$ will lie to the right of the extensions $f^3$. As a result of this construction when the gear $g^4$ is in proper mesh with one of the gears $g'$, $g^2$, and $g^3$ of the cone the sliding yoke F is prevented from moving longitudinally of the machine by the engagement of one or both of the extensions $f^3$ with the lug $f$, formed on the swinging frame F. Again, when this swinging frame F is moved so as to disengage the cone-gear entirely from the gear $g^4$ if such gear $g^4$ is not moved to a proper position longitudinally of the machine the end of one of the extensions $f^3$ will strike the end of the lug $f$ when an attempt is made to swing frame F over to engage one of the gears of the cone with the gear $g^4$. Thus it is necessary for the gear $g^4$ to be in the right longitudinal adjustment before it can be brought into mesh with any of the gears of the cone, and when in mesh with one of them it is impossible to move such gear $g^4$ longitudinally on its shaft. In this way improper adjustments and the damage that might result therefrom are prevented.

When the pulley P is rotated in the direction indicated by the arrow in Fig. 1, the resultant tendency of the swinging frame F to rotate is over to the left, and as this is the normal direction of the rotation of the machine provision is made to take this thrust upon suitable bolts $t$, $t'$, and $t^2$, which are adjusted to permit the right depth of mesh, whichever gear is in engagement with gear $g^4$. It will be noticed that the right-hand faces of the grooves $h^3$, as seen in Fig. 1, form slight angles with lines through the center of the shaft S. This is for the purpose of drawing the frame F up against one of the bolts $t$, $t'$, and $t^2$ as the handle $h'$ is forced into the corresponding notch $h^3$ to take up the lost motion and prevent chatter of the coöperating parts. Suitable lock-nuts are provided on the bolts $t$, $t'$, and $t^2$ for securing them in any desired adjustment. A bottom plate $a$ is formed in the lower portion of the frame and casing of the machine to provide a closed cavity, which may contain oil for the gears to run in. A suitable cock $v$ is provided to drain off the oil when desired. Should the extensions $f^3$ or the lug $f$ or the notches $h^2$ and $h^3$ need tooling or fitting to secure the proper adjustment of the interlocking and operating mechanisms, the only parts that need be handled are the sliding yoke $F'$, the swinging frame F, and the top piece $A^2$, all of which are comparatively light, and therefore permit ready handling and accurate adjustment.

From the foregoing description it is believed that the operation of my speed-varying mechanism is sufficiently obvious to call for no further description thereof herein.

What I claim is—

1. A first shaft and a frame angularly adjustable thereon, a cone-gear revolubly supported in such frame, means for communicating motion between such first shaft and such cone, a second shaft and splined thereon a gear adjustable to engage the different steps of such cone, a first operating device for angularly adjusting such frame and a second operating device for adjusting such splined gear.

2. A first shaft and a frame angularly adjustable thereon, a cone-gear revolubly supported in such frame, means for communicating motion between such first shaft and such cone, a second shaft and splined thereon a gear adjustable to engage the different steps of such cone and means for preventing the adjustment of such frame when such splined gear is not in alinement with one of the gears of such cone.

3. A first shaft and a frame angularly adjustable thereon, a cone-gear revolubly supported in such frame, means for communicating motion between such first shaft and such cone, a second shaft and splined thereon a gear adjustable to engage the different steps of such cone and means for preventing the adjustment of such splined gear when in mesh with one of the gears of such cone.

4. A first shaft and a frame angularly adjustable thereon, a cone-gear revolubly supported in such frame, means for communicating motion between such first shaft and such cone, a second shaft and splined thereon a gear adjustable to engage the different steps of such cone, means for preventing the adjustment of such frame when such splined gear is not in alinement with one of the gears of such cone and means for preventing the adjustment of such splined gear when in mesh with one of the gears of such cone.

5. A first shaft and a frame angularly adjustable thereon, a cone-gear revolubly supported in such frame, means for communicating motion between such first shaft and such cone, a second shaft and splined thereon a gear adjustable to engage the different steps of such cone, a first operating device for angularly adjusting such frame, a second operating device for adjusting such splined gear and means for preventing the adjustment of such frame when such splined gear is not in alinement with one of the gears of such cone.

6. A first shaft and a frame angularly adjustable thereon, a cone-gear revolubly supported in such frame, means for communicating motion between such first shaft and such cone, a second shaft and splined thereon a gear adjustable to engage the different steps of such cone, a first operating device for angularly adjusting such frame, a second operating device for adjusting such splined gear and means for preventing the adjustment of such splined gear when in mesh with one of the gears of such cone.

7. A first shaft and a frame angularly adjustable thereon, a cone-gear revolubly supported in such frame, means for communicating motion between such first shaft and such cone, a second shaft and splined thereon a gear adjustable to engage the different steps of such cone, a first operating device for angularly adjusting such frame, a second operating device for adjusting such splined gear, means for preventing the adjustment of such frame when such splined gear is not in alinement with one of the gears of such cone and means for preventing the adjustment of such splined gear when in mesh with one of the gears of such cone.

8. A first shaft and a frame angularly adjustable thereon, a cone-gear revolubly supported in such frame, means for communicating motion between such first shaft and such cone, a second shaft and splined thereon a gear adjustable to engage the different steps of such cone and operating devices carrying members coöperating to prevent the adjustment of such frame when such splined gear is not in alinement with one of the gears of such cone.

9. A first shaft and a frame angularly adjustable thereon, a cone-gear revolubly supported in such frame, means for communicating motion between such first shaft and such cone, a second shaft and splined thereon a gear adjustable to engage the different steps of such cone and operating devices carrying members coöperating to prevent the adjustment of such splined gear when in mesh with one of the gears of such cone.

10. A first shaft and a frame angularly adjustable thereon, a cone-gear revolubly supported in such frame, means for communicating motion between such first shaft and such cone, a second shaft and splined thereon a gear adjustable to engage the different steps of such cone and operating devices carrying members coöperating to prevent the adjustment of such frame when such splined gear is not in alinement with one of the gears of such cone and also carrying members coöperating to prevent the adjustment of such splined gear when in mesh with one of the gears of such cone.

11. A first shaft and a frame angularly adjustable thereon, a cone-gear revolubly supported in such frame, means for communicating motion between such first shaft and such cone, a second shaft and splined thereon a gear adjustable to engage the different steps of such cone, a first operating device for angularly adjusting such frame and a second operating device for adjusting such splined gear, such operating devices carrying members coöperating to prevent the adjustment of such frame when such splined gear is not in alinement with one of the gears of such cone.

12. A first shaft and a frame angularly adjustable thereon, a cone-gear revolubly supported in such frame, means for communicating motion between such first shaft and such cone, a second shaft and splined thereon a gear adjustable to engage the different steps of such cone, a first operating device for angularly adjusting such frame and a second operating device for adjusting such splined gear, such operating devices carrying members coöperating to prevent the adjustment of such splined gear when in mesh with one of the gears of such cone.

13. A first shaft and a frame angularly adjustable thereon, a cone-gear revolubly supported in such frame, means for communicating motion between such first shaft and such cone, a second shaft and splined thereon a gear adjustable to engage the different steps of such cone, a first operating device for angularly adjusting such frame and a second operating device for adjusting such splined gear, such operating devices carrying members coöperating to prevent the adjustment of such frame when such splined gear is not in alinement with one of the gears of such cone and also carrying members coöperating to prevent the adjustment of such splined gear when in mesh with one of the gears of such cone.

14. A first shaft and a frame angularly adjustable thereon, a cone-gear revolubly supported in such frame, means for communicating motion between such first shaft and such cone, a second shaft and splined thereon a gear adjustable to engage the different steps of such cone and operating devices carrying engaging members coöperating to prevent the adjustment of such frame when such splined gear is not in alinement with one of the gears of such cone.

15. A first shaft and a frame angularly adjustable thereon, a cone-gear revolubly supported in such frame, means for communicating motion between such first shaft and such cone, a second shaft and splined thereon a gear adjustable to engage the different steps of such cone and operating devices carrying engaging members coöperating to prevent the adjustment of such splined gear when in mesh with one of the gears of such cone.

16. A first shaft and a frame angularly adjustable thereon, a cone-gear revolubly supported in such frame, means for communicating motion between such first shaft and such cone, a second shaft and splined thereon a gear adjustable to engage the different steps of such cone and operating devices carrying engaging members coöperating to prevent the adjustment of such frame when such splined gear is not in alinement with one of the gears of such cone and also carrying engaging members coöperating to prevent the adjustment of such splined gear when in mesh with one of the gears of such cone.

17. A first shaft and a frame angularly adjustable thereon, a cone-gear revolubly supported in such frame, means for communicating motion between such first shaft and such cone, a second shaft and splined thereon a gear adjustable to engage the different steps of such cone, a first operating device for angularly adjusting such frame and a second operating device for adjusting such splined gear, such operating devices carrying engaging members coöperating to prevent the adjustment of such frame when such splined gear is not in alinement with one of the gears of such cone.

18. A first shaft and a frame angularly adjustable thereon, a cone-gear revolubly supported in such frame, means for communicating motion between such first shaft and such cone, a second shaft and splined thereon a gear adjustable to engage the different steps of such cone, a first operating device for angularly adjusting such frame and a second operating device for adjusting such splined gear, such operating devices carrying engaging members coöperating to prevent the adjustment of such splined gear when in mesh with one of the gears of such cone.

19. A first shaft and a frame angularly adjustable thereon, a cone-gear revolubly supported in such frame, means for communicating motion between such first shaft and such cone, a second shaft and splined thereon a gear adjustable to engage the different steps of such cone, a first operating device for angularly adjusting such frame and a second operating device for adjusting such splined gear, such operating devices carrying engaging members coöperating to prevent the adjustment of such frame when such splined gear is not in alinement with one of the gears of such cone and also carrying engaging members coöperating to prevent the adjustment of such splined gear when in mesh with one of the gears of such cone.

20. A first shaft and a frame angularly adjustable thereon, gearing revolubly supported in such frame, a second shaft and gearing splined thereon and two independent operating devices, one arranged to actuate such frame and the other arranged to move such splined gearing longitudinally on such second shaft, such operating devices carrying members coöperating to prevent the angular adjustment of such frame when such splined gearing is not in one of its operative positions.

21. A first shaft and a frame angularly adjustable thereon, gearing revolubly supported in such frame, a second shaft and gearing splined thereon and two independent operating devices, one arranged to actuate such frame and the other arranged to move such splined gearing longitudinally on such second shaft, such operating devices carrying members coöperating to prevent the adjustment of such splined gearing when in mesh with the gearing carried by such frame.

22. A first shaft and a frame angularly adjustable thereon, gearing revolubly supported in such frame, a second shaft and gearing splined thereon and two independent operating devices, one arranged to actuate such frame and the other arranged to move such splined gearing longitudinally on such second shaft, such operating devices carrying members coöperating to prevent the angular adjustment of such frame when such splined gearing is not in one of its operative positions and also carrying members coöperating to prevent the adjustment of such splined gearing when in mesh with the gearing carried by such frame.

23. A first shaft and a frame angularly adjustable thereon, gearing revolubly supported in such frame, a second shaft and gearing splined thereon and two independent operating devices, one arranged to actuate such frame and the other arranged to move such splined gearing longitudinally on such second shaft, such operating devices carrying engaging members coöperating to prevent the angular adjustment of such frame when such splined gearing is not in one of its operative positions.

24. A first shaft and a frame angularly adjustable thereon, gearing revolubly supported in such frame, a second shaft and gearing splined thereon and two independent operating devices, one arranged to actuate such frame and the other arranged to move such splined gearing longitudinally on such second shaft, such operating devices carrying engaging members coöperating to prevent the adjustment of such splined gearing when in mesh with the gearing carried by such frame.

25. A first shaft and a frame angularly adjustable thereon, gearing revolubly supported in such frame, a second shaft and gearing splined thereon and two independent operating devices, one arranged to actuate such frame and the other arranged to move such splined gearing longitudinally on such second shaft, such operating devices carrying engaging members coöperating to prevent the angular adjustment of such frame when such splined gearing is not in one of its operative positions and also carrying engaging members coöperating to prevent the adjustment of such splined gearing when in mesh with the gearing carried by such frame.

ROBERT T. HAZELTON.

Witnesses:
ALBERT C. BELL,
CLARA M. SIENER.